(12) United States Patent
Kasilya Sudarsan et al.

(10) Patent No.: US 11,741,983 B2
(45) Date of Patent: Aug. 29, 2023

(54) SELECTIVE SUPPRESSION OF NOISES IN A SOUND SIGNAL

(71) Applicant: QUALCOMM Incorporated, San Diego, CA (US)

(72) Inventors: Vishnu Vardhan Kasilya Sudarsan, Bangalore (IN); Naga Chandan Babu Gudivada, Hyderabad (IN); Dinesh Ramakrishnan, Irvine, CA (US); Rameshkumar Karuppusamy, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 17/147,806

(22) Filed: Jan. 13, 2021

(65) Prior Publication Data

US 2022/0223165 A1 Jul. 14, 2022

(51) Int. Cl.
*G10L 21/0232* (2013.01)
*G06N 20/00* (2019.01)
*G10L 21/0216* (2013.01)

(52) U.S. Cl.
CPC .......... *G10L 21/0232* (2013.01); *G06N 20/00* (2019.01); *G10L 2021/02163* (2013.01)

(58) Field of Classification Search
CPC ....... G10L 21/0232; G10L 2021/02163; G10L 21/0208; G10L 15/08; G10L 21/0216; G10L 25/78; G10L 19/012; G10L 2015/225; G06N 20/00; H04R 1/1083; H04R 2499/11; H04R 3/005; H04R 2410/05; H04R 3/04; H04R 3/02; H04R 2430/01; H04M 2201/38
See application file for complete search history.

(56) References Cited

U.S. PATENT DOCUMENTS

| | | | |
|---|---|---|---|
| 8,639,516 B2* | 1/2014 | Lindahl | G10L 21/0208 704/275 |
| 10,770,057 B1* | 9/2020 | Marten | G10K 11/17854 |
| 2010/0172510 A1* | 7/2010 | Juvonen | G10K 11/17873 381/71.1 |
| 2011/0013075 A1* | 1/2011 | Kim | H04N 7/147 348/370 |
| 2011/0166856 A1* | 7/2011 | Lindahl | G10L 21/0208 381/94.1 |

(Continued)

OTHER PUBLICATIONS

International Search Report and Written Opinion—PCT/US2021/063070—ISA/EPO—dated Apr. 22, 2022.

*Primary Examiner* — Akelaw Teshale
(74) *Attorney, Agent, or Firm* — QUALCOMM Incorporated

(57) ABSTRACT

System and method for detecting and identifying noises in a sound signal occurring during a call on a mobile device and selectively filtering and suppressing the noises in the sound signal are provided. In the mobile device, a processor is configured to receive a sound signal, detect noises in the received sound signal, identify the noises in the received sound signal, display the identified noises in a user interface (UI), receive a selection of the displayed identified noises from the UI, and filter the received selection of the displayed identified noises from the received sound signal. The processor may use a machine learning module with a neural network to detect and identify the noises in the received sound signal.

26 Claims, 6 Drawing Sheets

(56) References Cited

U.S. PATENT DOCUMENTS

| | | | |
|---|---|---|---|
| 2015/0195641 A1* | 7/2015 | Di Censo | H04R 1/1083 |
| | | | 381/71.6 |
| 2015/0255085 A1* | 9/2015 | Yamabe | G10L 21/0208 |
| | | | 704/226 |
| 2016/0004405 A1* | 1/2016 | Kim | G06F 3/167 |
| | | | 715/727 |
| 2016/0004499 A1* | 1/2016 | Kim | H04S 7/30 |
| | | | 715/716 |
| 2016/0065742 A1* | 3/2016 | Nasir | H04M 3/56 |
| | | | 455/416 |
| 2018/0014107 A1* | 1/2018 | Razouane | H04R 1/1083 |
| 2019/0005421 A1* | 1/2019 | Hammel | G06Q 10/06393 |
| 2021/0400373 A1* | 12/2021 | Marti | G10K 11/17873 |
| 2022/0337945 A1* | 10/2022 | Marti | G06V 10/235 |

* cited by examiner

SELECTIVE SUPPRESSION OF NOISES IN A SOUND SIGNAL

FIELD OF DISCLOSURE

Disclosed aspects are directed to filtering and suppressing noises that occur during calls. More particularly, exemplary aspects are directed to selectively filtering and suppressing different types of noises that occur during calls especially conference calls.

BACKGROUND

During voice calls, video calls, conference calls or various online meeting calls, listeners on the calls may hear different types of noises from the speaker including background noises such as wind noise, traffic noise, noises from children, pets or household activities and any other types of noises that may cause disturbance to the conversations occurring on various calls. Such noises decrease the quality of the calls and may cause delays because the listeners may not properly hear the speaker. Since more and more people are working from home, various noises may affect the productivity of the workers while communicating with other workers through various calls including voice calls, video calls, conference calls and online meeting calls.

Accordingly, there is a need for systems and methods that suppress and filter various types of noises that may occur while conducting calls.

SUMMARY

Exemplary aspects of the disclosure are directed to systems and methods for detecting and identifying noises in a sound signal occurring during a call and selectively filtering and suppressing the noises in the sound signal. For example, an exemplary aspect is directed to a method of suppressing noises in a sound signal in a mobile device, the method comprising: receiving the sound signal; detecting the noises in the received sound signal; identifying the noises in the received sound signal; displaying the identified noises in a user interface (UI); receiving a selection of the displayed identified noises from the UI; and filtering the received selection of the displayed identified noises from the received sound signal The method further comprises: utilizing a machine learning module with a neural network to detect and identify the noises in the received sound signal; transmitting the filtered sound signal; using a location of the mobile device to identify the noises in the received sound signal; converting the received sound signal from an analog signal to a digital signal; and converting the filtered sound signal from a digital signal to an analog signal.

Another exemplary aspect is directed to a mobile device comprising: a memory; and a processor communicatively coupled to the memory, the processor configured to: receive a sound signal, detect noises in the received sound signal, identify the noises in the received sound signal, display the identified noises in a user interface (UI), receive a selection of the displayed identified noises from the UI, and filter the received selection of the displayed identified noises from the received sound signal. The processor is further configured to: utilize a machine learning module with a neural network to detect and identify the noises in the received sound signal and use a location of the mobile device to identify the noises in the received sound signal.

Another exemplary aspect is directed to a mobile device comprising: means for receiving a sound signal; means for detecting noises in the received sound signal; means for identifying the noises in the received sound signal; means for displaying the identified noises in a user interface (UI); means for receiving a selection of the displayed identified noises from the UI; and means for filtering the received selection of the displayed identified noises from the received sound signal.

The mobile device further comprises: means for utilizing a machine learning module with a neural network to detect and identify the noises in the received sound signal; means for transmitting the filtered sound signal; and means for using a location of the mobile device to identify the noises in the received sound signal.

Yet another exemplary aspect is directed to a non-transitory computer-readable storage medium comprising code, which, when executed by a processor, causes the processor to suppress noises in a sound signal, the non-transitory computer-readable storage medium comprising: code for receiving a sound signal; code for detecting noises in the received sound signal; code for identifying the noises in the received sound signal; code for displaying the identified noises in a user interface (UI); code for receiving a selection of the displayed identified noises from the UI; code for filtering the received selection of the displayed identified noises from the received sound signal; code for utilizing a machine learning module with a neural network to detect and identify the noises in the received sound signal. code for transmitting the filtered sound signal; and code for using a location of the mobile device to identify the noises in the received sound signal.

BRIEF DESCRIPTION OF THE DRAWINGS

The accompanying drawings are presented to aid in the description of aspects and are provided solely for illustration of the aspects and not limitation thereof.

DETAILED DESCRIPTION

Figure 1:
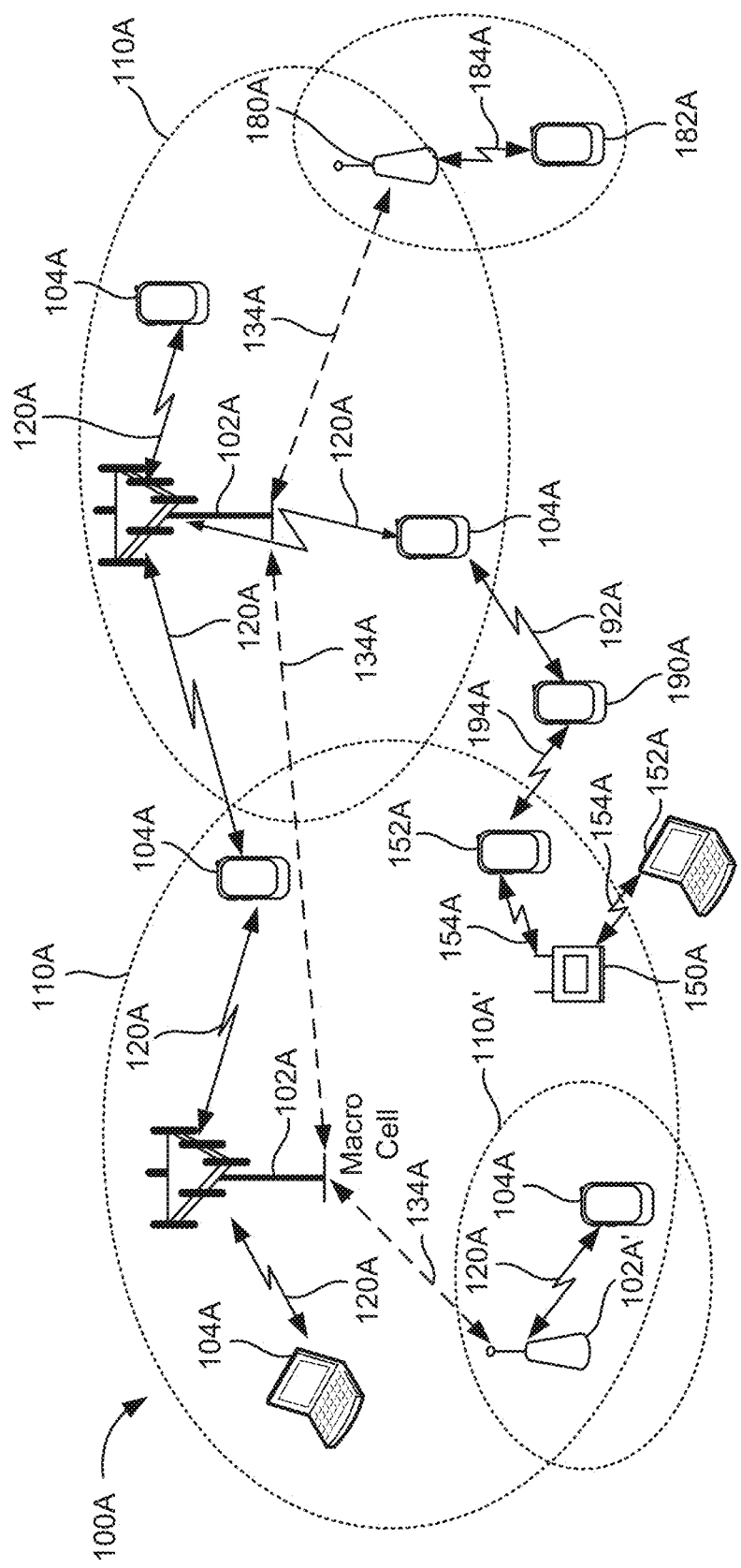
FIG. 1 illustrates an exemplary wireless communications system, according to various aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts The word "exemplary" is used herein to mean "serving as an example, instance, or illustration." Any aspect described herein as "exemplary" is not necessarily to be construed as preferred or advantageous over other aspects. Likewise, the term "aspects of the disclosure" does not require that all aspects of the disclosure include the discussed feature, advantage or mode of operation.

The terminology used herein is for the purpose of describing particular aspects only and is not intended to be limiting of aspects of the disclosure. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Aspects of the present disclosure are directed to detecting and identifying noises in sound signals that occur during calls and selectively filtering and suppressing the noises. In an aspect, a machine learning module with a neural network may be utilized to detect and identify the noises. In another aspect, a user may be allowed to select the noises that the user wants to filter and suppress during calls.

According to various aspects, FIG. 1 illustrates an exemplary wireless communications system 100A. The wireless communications system 100A (which may also be referred to as a wireless wide area network (WWAN)) may include various base stations 102A and various UEs 104A. The base stations 102A may include macro cells (high power cellular base stations) and/or small cells (low power cellular base stations), wherein the macro cells may include Evolved NodeBs (eNBs), where the wireless communications system 100A corresponds to an LTE network, or gNodeBs (gNBs), where the wireless communications system 100A corresponds to a 5G network or a combination of both, and the small cells may include femtocells, picocells, microcells, etc.

The base stations 102A may collectively form a Radio Access Network (RAN) and interface with an Evolved Packet Core (EPC) or Next Generation Core (NGC) through backhaul links. In addition to other functions, the base stations 102A may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102A may communicate with each other directly or indirectly (e.g., through the EPC/NGC) over backhaul links 134A, which may be wired or wireless.

The base stations 102A may wirelessly communicate with the UEs 104A. Each of the base stations 102A may provide communication coverage for a respective geographic coverage area 110A. In an aspect, although not shown in FIG. 1A, geographic coverage areas 110A may be subdivided into a plurality of cells (e.g., three), or sectors, each cell corresponding to a single antenna or array of antennas of a base station 102A. As used herein, the term "cell" or "sector" may correspond to one of a plurality of cells of a base station 102A, or to the base station 102A itself, depending on the context.

While neighboring macro cell geographic coverage areas 110A may partially overlap (e.g., in a handover region), some of the geographic coverage areas 110A may be substantially overlapped by a larger geographic coverage area 110A. For example, a small cell base station 102A' may have a geographic coverage area 110A' that substantially overlaps with the geographic coverage area 110A of one or more macro cell base stations 102A. A network that includes both small cell and macro cells may be known as a heterogeneous network. A heterogeneous network may also include Home eNBs (HeNBs), which may provide service to a restricted group known as a closed subscriber group (CSG). The communication links 120A between the base stations 102A and the UEs 104A may include uplink (UL)(also referred to as reverse link) transmissions from a UE 104A to a base station 102A and/or downlink (DL) (also referred to as forward link) transmissions from a base station 102A to a UE 104A. The communication links 120A may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100A may further include a wireless local area network (WLAN) access point (AP) 150A in communication with WLAN stations (STAs) 152A via communication links 154A in an unlicensed frequency spectrum (e.g., 5 GHz). When communicating in an unlicensed frequency spectrum, the WLAN STAs 152A and/or the WLAN AP 150A may perform a clear channel assessment (CCA) prior to communicating in order to determine whether the channel is available.

The small cell base station 102A' may operate in a licensed and/or an unlicensed frequency spectrum. When operating in an unlicensed frequency spectrum, the small cell base station 102A' may employ LTE or 5G technology and use the same 5 GHz unlicensed frequency spectrum as used by the WLAN AP 150A. The small cell base station 102A', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100A may further include a mmW base station 180A that may operate in mmW frequencies and/or near mmW frequencies in communication with a UE 182A. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave (mmW). Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180A may utilize beamforming 184A with the UE 182A to compensate for the extremely high path loss and short range. Further, it will be appreciated that in alternative configurations, one or more base stations 102A may also transmit using mmW or near mmW and beamforming. Accordingly, it will be appreciated that the foregoing illustrations are merely examples and should not be construed to limit the various aspects disclosed herein.

The wireless communications system 100A may further include one or more UEs, such as UE 190A, that connects indirectly to one or more communication networks via one or more device-to-device (D2D) peer-to-peer (P2P) links. In the embodiment of FIG. 1, UE 190A has a D2D P2P link 192A with one of the UEs 104A connected to one of the base stations 102A (e.g., through which UE 190A may indirectly obtain cellular connectivity) and a D2D P2P link 194A with WLAN STA 152A connected to the WLAN AP 150A (through which UE 190A may indirectly obtain WLAN-based Internet connectivity). In an example, the D2D P2P links 192A-194A may be supported with any well-known D2D radio access technology (RAT), such as LTE Direct (LTE-D), WiFi Direct (WiFi-D), BLUETOOTH, and so on.

Figure 4:
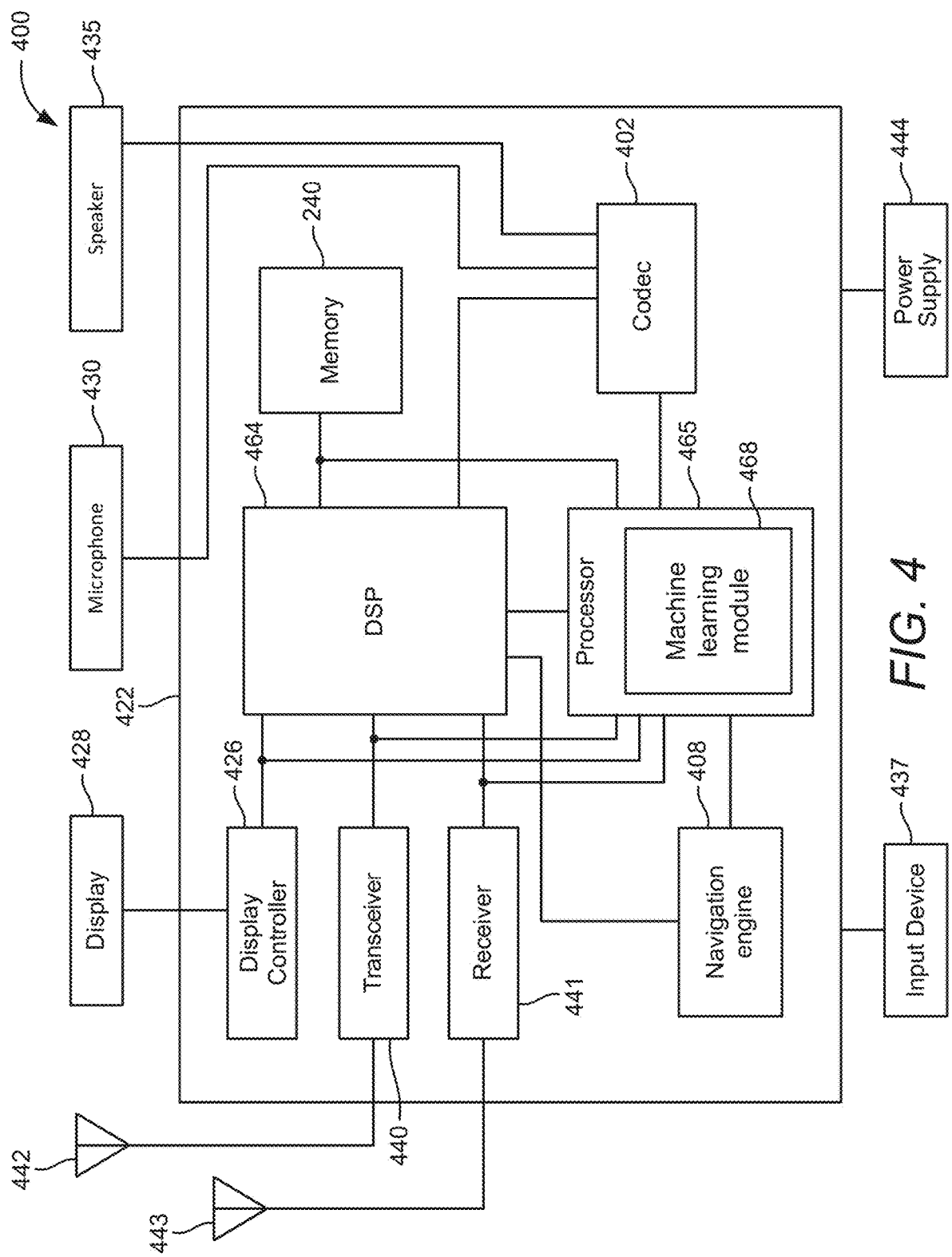
FIG. 4 illustrates an exemplary implementation of a wireless communication device configured for filtering and suppressing noises in a sound signal occurring during a call.

With reference now to FIG. 4, a simplified schematic of an exemplary mobile device 400 that detects and identifies noises in a sound signal occurring during a call and selectively filters and suppresses the noises is illustrated. Mobile device 400 is similar to UE 104A or other UEs shown in FIG. 1 in many exemplary aspects, and the depiction and description of mobile device 400 includes various additional exemplary components not shown with relation to UE 104A and other UEs shown in FIG. 1. In an aspect, mobile device 400 may be similar to WLAN STAs 152A shown in FIG. 1. Furthermore, mobile device 400 maybe similar to PC computers, laptops, tablets or other smart devices that are able to communicate with other UEs and mobile devices over the internet.

As shown in FIG. 4, mobile device 400 includes digital signal processor (DSP) 464 and a general purpose processor, depicted as processor 465. Processor 465 includes machine learning (ML) module 468. In an aspect, ML module 468 may be included in DSP 464 instead of processor 465 or may be a separate module located outside of processor 465 and DSP 464. The below described functions and methods related to detecting and identifying noises in a sound signal occurring during a call and selectively filtering and suppressing the noises can be performed in DSP 464, processor 465. ML module 468 or any combination of the processing elements thereof. Accordingly, in some aspects, processor 465 and the included ML module 468 may be configured to perform operations described with regard to detecting and identifying noises in a sound signal occurring during a call and selectively filtering and suppressing the noises, but it will be understood that some of the operations related to detecting and identifying noises in a sound signal occurring during a call and selectively filtering and suppressing the noises can be performed in DSP 464, and moreover, these operations can be implemented in any suitable combination of hardware and software.

ML module 468 may be an artificial neural network adapted to detecting and identifying different types of noises that occur during calls. An artificial neural network is particularly suited for detecting and identifying different types of noises because a neural network may be trained to recognize different types of noises that may occur in different situations and environment. In an aspect, a neural network implemented by ML module 468 may be a deep convolutional network. A deep convolutional network is particularly well suited for detecting and identifying noises and for its robustness and ability to efficiently train its network to adapt to the environment to detecting and identifying noises that may occur during a call. However, ML module 468 is not limited to a deep convolutional network but may implement other types of neural network such as a recurrent neural network (Ex. Long short-term memory (LSTM) network) or spiking neural network. A recurrent neural network is also well suited for detecting and identifying noises in calls.

Both DSP 464 and processor 465 may be coupled to memory 240. Navigation engine 408 can be coupled to DSP 464 and processor 465 and used to provide location data to DSP 464 and processor 465. Codec 402 can be coupled to DSP 464, processor 465, microphone 430 and speaker 435. Codec 402 may convert analog signals from microphone 430 to digital signals and provide the digital signals to processor 465 and DSP 464. In addition, codec 402 may convert digital signals from processor 465 and DSP 464 to analog signals and provide the analog signals to speaker 435. Display controller 426 can be coupled to DSP 464, processor 465, and to display 428. Display controller 426 may display user interface (UI) on display 428 as directed by processor 465 and/or DSP 464.

Other components, such as transceiver 440 (which may be part of a modem) and receiver 441 are also illustrated. Transceiver 440 can be coupled to wireless antenna 442, which may be configured to receive wireless signals from a calibrated terrestrial source such as WWAN, CDMA, etc. Transceiver 440 may receive and/or transmit signals to and from base station 102A. Receiver 441 can be coupled to a satellite or GNSS antenna 443, which may be configured to receive wireless signals from satellites or GNSS signals. In a particular aspect, DSP 464, processor 465, machine learning module 468, display controller 426, memory 240, navigation engine 408, transceiver 440, receiver 441 and codec 402 are included in a system-in-package or system-on-chip device 422.

In a particular aspect, input device 437 and power supply 444 are coupled to the system-on-chip device 422. Moreover, in a particular aspect, as illustrated in FIG. 4, display 428, input device 437, microphone 430, speaker 435, wireless antenna 442, GNSS antenna 443, and power supply 444 are external to the system-on-chip device 422. However, each of display 428, input device 437, microphone 430, speaker 435, wireless antenna 442, GNSS antenna 443, and power supply 444 can be coupled to a component of the system-on-chip device 422, such as an interface or a controller.

In an aspect, when the user of mobile device 400 starts to speak to other participants of a call, microphone 430 receives the sound coming from the user and any other sounds that may be present while the user is speaking into microphone 430. In other words, the user of mobile device 400 becomes the originator on the call when the user is speaking into microphone 430. Calls made on mobile device 400 may be voice calls, video calls, conference calls or other various online meeting calls. The sound received by microphone 430 may include user's voice and various noises that may be present while the user is speaking into microphone 430. Microphone 430 transmits the received sound signal that includes the user's voice and noises to codec 402. Codec 402 processes the received sound signal that may be an analog signal and converts the received sound signal to a digital sound signal. Codec 402 transmits the converted digital sound signal to processor 465. Codec 402 may also transmit the converted digital sound signal to DSP 464.

In an aspect, processor 465 receives the sound signal from codec 402 and may process the sound signal by utilizing ML module 468. ML module 468 may have been pretrained to detect and identify different types of noises that commonly occur during calls. For example, different types of commonly occurring noises may include road noise, children noise, traffic noise, wind noise, animal noise, household noise, urban environment noise, etc. In addition, navigation engine 408 may provide the location information of mobile device 400 to processor 465 to assist in the identification of noises that may occur in the background based on the location of mobile device 400. For example, if the user of mobile device 400 is located at a railway station, navigation engine 408 may provide this location information to processor 465. Processor 465 and ML module 468 may use this location information to assist in the identification and detection of the background noises that may occur at a railway station such as noises made by moving trains and crowds at a railway station. In other words, ML module 468 may use the location of mobile device 400 to assist in the identification of noises that may occur when the user of mobile device 400 is speaking on mobile device 400 because the location of mobile device 400 may dictate the likelihood of certain noises that may occur during the call. For example, if mobile device 400 is located next to a busy street, there is high probability that microphone 430 will pick up traffic noises.

ML module 468 may have a training database (not shown) that contains the training that allows ML module 468 to detect and identify various type of noises that occur during calls. ML module 468 may use the training in the training database to identify and detect the noises that are present in the sound signal received from codec 402. As stated above, ML module 468 and processor 465 may use the location information received from navigation engine 408 to assist in the identification of the noises that are present in the received sound signal.

Figure 2A:
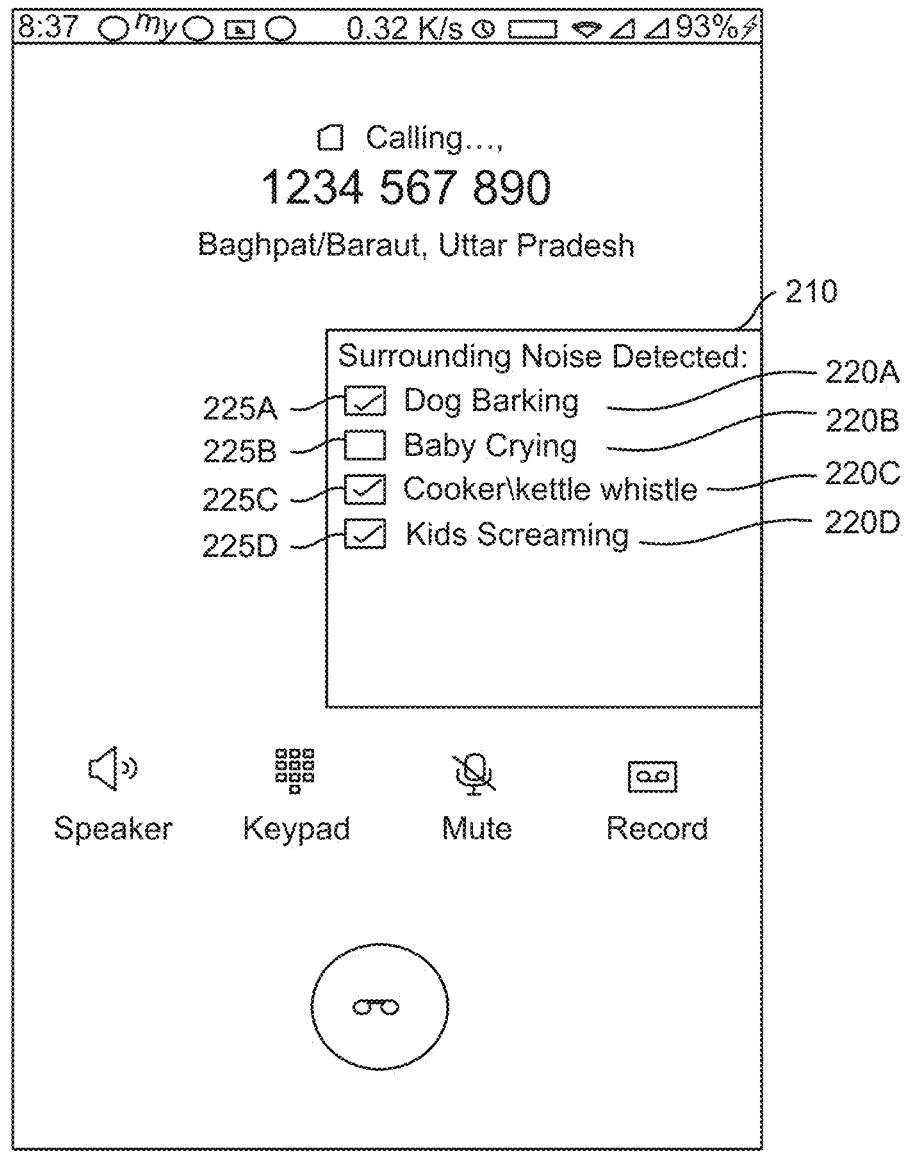
FIGS. 2A-2B illustrate an exemplary user interface (UI) for a mobile device.

After identifying the noises in the sound signal received from codec 402, processor 465 may display user interface (UI) 200 as shown in FIG. 2A. UI 200 may be shown on display 428. UI 200 includes menu 210 as illustrated in FIG. 2A. Menu 210 may list the types of noises that have been identified by processor 465 and ML module 468. In the example shown in FIG. 2A, processor 465 and ML module 468 have identified the following noises in the sound signal received from codec 402: dog barking 220A, baby crying 220B, cooker/kettle whistle 220C and kids screaming 220D. Menu 210 lists and shows all of the identified noises as shown in FIG. 2A. Each of the listed noises 220A-220D has a respective check boxes 225A-225D next to them. UI 200 allows the user of mobile device 400 to check off the noises 220A-220D that the user wants to filter out of the user's communication during the call by inputting a check mark in the respective check boxes 225A-225D. The type of noises shown in FIG. 2A is just an exemplary list, and ML module 468 is not limited to identifying the noises shown on FIG. 2A. ML module 468 may detect and identify many other types of noises based on the training received. In other instances, menu 210 may list other types of noises not shown in FIG. 2A based on the identification of the noises in the received sound signal.

For example, if the user of mobile device 400 wants to filter out and suppress noises 220A, 220C and 220D, the user may place check marks in the respective check boxes 225A, 225C and 225D as shown in FIG. 2A. However, if the user does not want to filter out noise 220B, the user of mobile device 400 should not place a check mark in check box 225B as shown in FIG. 2A.

Processor 465 receives from UI 200 the noises chosen by the user of mobile device 400 for filtering. Processor 465 may filter the chosen noises from the sound signal received from codec 402 thereby suppressing the chosen noises. In an aspect, processor 465 may use DSP 464 to filter the noises chosen by the user of mobile device 400. In the example shown in FIG. 2A, processor 465 filters noises 220A, 220C and 220D from the sound signal received from codec 402.

After the noises have been filtered, processor 465 transmits the filtered sound signal to transceiver 440. Transceiver 440 transmits the filtered sound signal to other UE(s) and mobile devices that are on the call with mobile device 400. Thus, target or listener mobile devices and UEs on the call would receive a sound signal without the filtered noises chosen by the user of mobile device 400.

In another aspect, the user of mobile device 400 may be a listener (i.e., a target) rather than a speaker (i.e., originator) when the user of mobile device 400 is on a call with one or more UEs and mobile devices. When the user of mobile device 400 is the listener, transceiver 440 receives a signal sent by another UE through antenna 442. The received signal may include a sound signal comprising the sound spoken by the speaker and noises that occurred while the speaker was speaking into the speaker's UE. Transceiver 440 transmits the received sound signal to processor 465 to be processed.

Processor 465 receives the sound signal from transceiver 440 and may process the sound signal by utilizing ML module 468. As described above, ML module 468 may have been pretrained to recognize and identify different types of noises that commonly occur during calls. For example, different types of commonly occurring noises may include road noise, children noise, traffic noise, wind noise, animal noise, household noise, etc. ML module 468 may detect and identify the noises that are present in the sound signal received from transceiver 440.

Figure 2B:
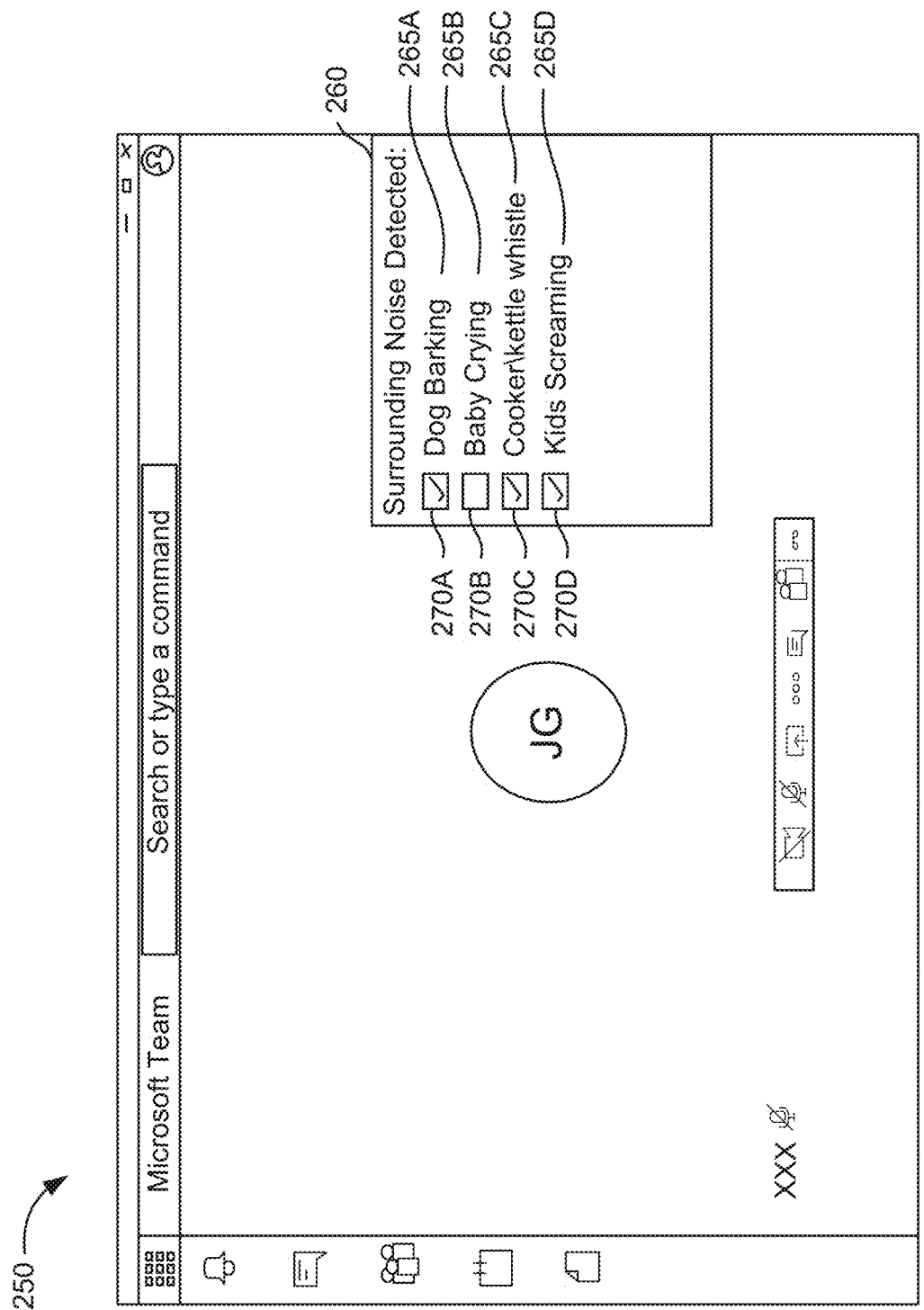

After detecting and identifying the noises in the sound signal received from transceiver 440, processor 465 may display user interface (UI) 250 as shown in FIG. 2B. UI 250 may be shown on display 428. UI 250 includes menu 260 as illustrated in FIG. 2B. Menu 260 may list the types of noises that have been identified by processor 465 and ML module 468. In the example shown in FIG. 2B, processor 465 and ML module 468 have detected and identified the following noises in the sound signal received from transceiver 440: dog barking 265A, baby crying 265B, cooker/kettle whistle 265C and kids screaming 265D. Menu 260 lists and shows all of the identified noises as shown in FIG. 2B. Each of the listed noises 265A-265D has a respective check boxes 270A-270D next to them. UI 250 allows the user of mobile device 400 to check off the noises 265A-265D that the user wants to filter out of the received sound signal by inputting a check mark in the respective check boxes 270A-270D. The type of noises shown in FIG. 2B is just an exemplary list, and ML module 468 is not limited to identifying the noises shown on FIG. 2B. ML module 468 may detect and identify many other types of noises based on the training received.

For example, if the user of mobile device 400 wants to filter out and suppress noises 265A, 265C and 265D, the user may place check marks in the respective check boxes 270A, 270C and 270D as shown in FIG. 2B. However, if the user does not want to filter out noise 265B, the user of mobile device 400 should not place a check mark in check box 270B as shown in FIG. 2B.

Processor 465 receives from UI 250 the noises chosen by the user of mobile device 400 for filtering. Processor 465 may filter the chosen noises from the sound signal received from transceiver 440. In an aspect, processor 465 may use DSP 464 to filter the noises chosen by the user of mobile device 400. In the example shown in FIG. 2B, processor 465 filters noises 265A, 265C and 265D from the sound signal received from transceiver 440.

In an aspect, while the user of mobile device 400 is listening to the speaker on the call, ML module 468 may detect and identify the background noises that exist around mobile device 400 in case the user of mobile device 400 becomes the speaker later. In some aspect, the detection may occur even though microphone 430 is muted. In other aspect, the detection may occur only when the microphone 430 is unmuted.

After the noises have been filtered, processor 465 transmits the filtered sound signal to codec 402. Codec 402 converts the filtered sound signal to an analog sound signal and transmits the analog sound signal to speaker 435. Consequently, the user of mobile device 400 will hear a sound signal that have filtered and suppressed the noises that the user of mobile device 400 have chosen to filter. Therefore, the user of mobile device 400 will not hear and be distracted by the noises that may have been transmitted from the speaker's UE.

Figure 3A:
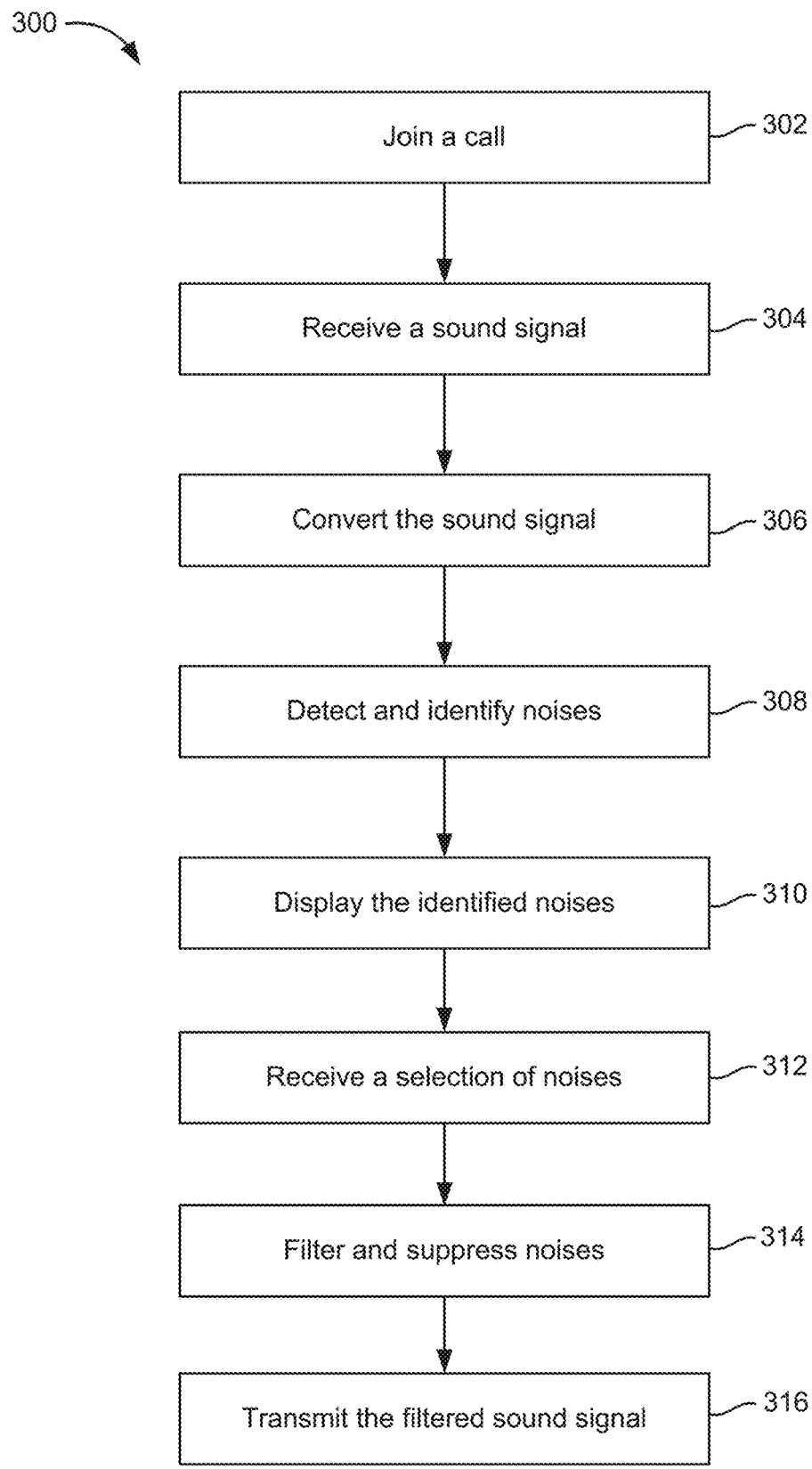
FIGS. 3A-3B illustrate flowcharts corresponding to one or more methods of filtering and suppressing noises in a sound signal occurring during a call, according to various aspects of the disclosure.

It will be appreciated that aspects include various methods for performing the processes, functions and/or algorithms disclosed herein. For example, FIG. 3A shows method 300 for detecting and identifying noises in a sound signal and filtering and suppressing the noises in the sound signal. The method may be performed by a device such as mobile device 400, UE 104A and other UEs shown in FIG. 1 such as WLAN STAs 152A. Furthermore, mobile device 400 maybe similar to PC computers, laptops, tablets or other smart devices that are able to communicate with other UEs and mobile devices over the internet.

At block 302, the method 300 joins a call. The call may be initiated by the user of mobile device 400 or UE 104A or received from other one or more UEs including mobile devices.

At block 304, the method 300 receives a sound signal including words spoken by the user of mobile device 400 and noises that may have occurred when the user was speaking into microphone 430. Microphone 430 may receive the words spoken by the user of mobile device 400 and noises that may have occurred while the user was speaking into microphone 430. Microphone 430 transmits the received sound signal to codec 402.

At block 306, the method 300 converts the received sound signal into a digital sound signal. Codec 402 may convert the sound signal received from microphone 430 into a digital sound signal. The analog sound signal from microphone 430 may be converted into a digital sound signal by codec 402. Codec 402 transmits the converted digital sound signal to processor 465.

At block 308, the method 300 detects and identifies noises in the sound signal. Processor 465 and ML module 468 may detect and identify the noises in the sound signal received from codec 402. ML module 486 may use trained artificial neural network to detect and identify the noises in the sound signal.

At block 310, the method 300 displays the identified noises on a display. Processor 465 may display UI 200 including menu 210 that lists the identified noises in the sound signal. UI 200 may further display checkboxes that allows the user of mobile device 400 to select the noises that the user wants to filter and suppress.

At block 312, the method 300 receives a selection of noises from the user. UI 200 may receive the noises that are selected by the user of mobile device 400 to be filtered and suppressed based on the checkboxes 225A-225D that were checked by the user of mobile device 400. UI 200 transmits the selection to processor 465.

At block 314, the method 300 filters and suppresses the noises chosen by the user. Processor 465 may filter and suppress the noises chosen by the user of mobile device 400. Processor 465 may use DSP 464 to filter the chosen noises in the sound signal. The filtered sound signal is transmitted to transceiver 440.

At block 316, the method 300 transmits the filtered sound signal to other UEs and mobile devices on the call. Transceiver 440 transmits the filtered sound signal received from processor 465 to other UEs and mobile devices on the call with mobile device 400.

Figure 3B:
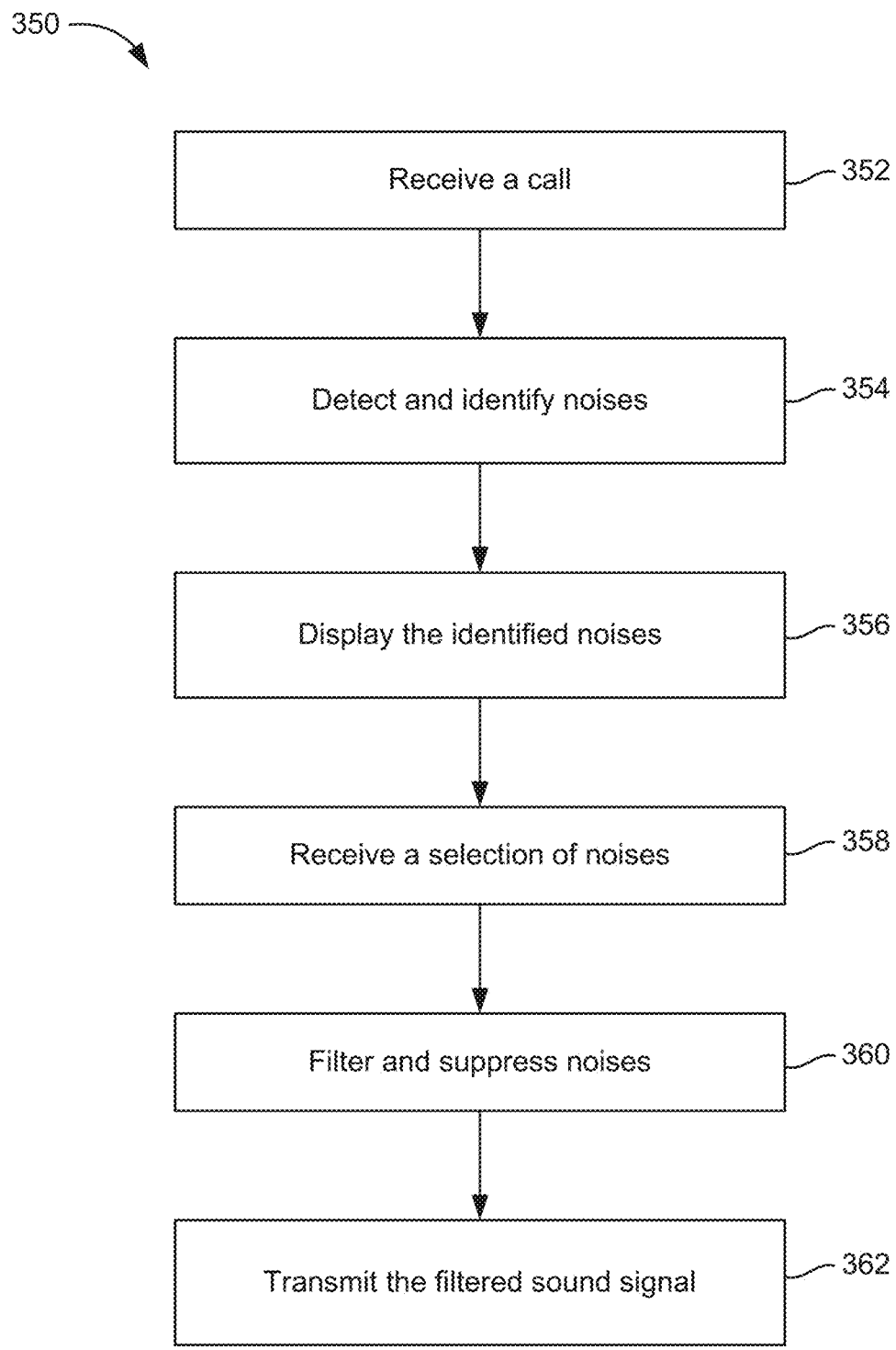

In another aspect. FIG. 3B shows a method 350 for detecting and identifying noises in a sound signal received from another mobile device or UE and filtering and suppressing the noises in the received sound signal. The method may be performed by a device such as mobile device 400, UE 104A and other UEs shown in FIG. 1 such as WLAN STAs 152A. Furthermore, mobile device 400 maybe similar to PC computers, laptops, tablets or other smart devices that are able to communicate with other UEs and mobile devices over the internet.

At block 352, the method 350 receives a sound signal from another UE or a mobile device during a call. Transceiver 440 may receive a signal that includes a sound signal from another UE or a mobile device. The signal may be received through antenna 442. Transceiver 440 may transmit the received sound signal to processor 465.

At block 354, the method 350 detects and identifies noises in the received sound signal. Processor 465 and ML module 468 may detect and identify the noises in the sound signal received from transceiver 440. ML module 468 may use trained artificial neural network to detect and identify the noises in the sound signal.

At block 356, the method 350 displays the identified noises on a display. Processor 465 may display UI 250 including menu 260 that lists the identified noises in the sound signal. UI 250 may further display checkboxes 270A-270D that allows the user of mobile device 400 to select the noises that the user wants to filter and suppress.

At block 358, the method 350 receives a selection of noises from the user. UI 250 may receive the noises that are selected by the user of mobile device 400 to be filtered and suppressed based on the checkboxes 270A-270D that were checked by the user. UI 250 transmits the selection to processor 465.

At block 360, the method 350 filters and suppresses the noises chosen by the user. Processor 465 may filter and suppress the noises chosen by the user of mobile device 400. Processor 465 may use DSP 464 to filter the chosen noises in the sound signal. The filtered sound signal is transmitted to codec 402.

At block 362, the method 350 transmits the filtered sound signal to the speaker. Codec 402 may convert the filtered sound signal to an analog signal and transmit the analog signal to speaker 435. Speaker 435 may play the filtered sound signal for the user's listening. Therefore, the user will hear a sound that does not include the noises chosen by the user.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of suppressing noises in a sound signal in a mobile device, the method comprising: receiving the sound signal; detecting the noises in the received sound signal; identifying the noises in the received sound signal; displaying the identified noises in a user interface (UI); receiving a selection of the displayed identified noises from the UI; and filtering the received selection of the displayed identified noises from the received sound signal.

Clause 2. The method of clause 1, further comprising: utilizing a machine learning module with a neural network to detect and identify the noises in the received sound signal.

Clause 3. The method of clause 2, further comprising: transmitting the filtered sound signal.

Clause 4. The method of clause 3, wherein the sound signal is received from a microphone.

Clause 5. The method of any of clauses 3 to 4, wherein the sound signal is received from another mobile device.

Clause 6. The method of any of clauses 4 to 5, wherein the filtered sound signal is transmitted to another mobile device.

Clause 7. The method of any of clauses 5 to 6, wherein the filtered sound signal is transmitted to a speaker.

Clause 8. The method of any of clauses 2 to 7, further comprising: using a location of the mobile device to identify the noises in the received sound signal.

Clause 9. The method of any of clauses 4 to 8, further comprising: converting the received sound signal from an analog signal to a digital signal.

Clause 10. The method of any of clauses 7 to 9, further comprising: converting the filtered sound signal from a digital signal to an analog signal.

Clause 11. An apparatus comprising a memory and at least one processor communicatively coupled to the memory, the memory and the at least one processor configured to perform a method according to any of clauses 1 to 10.

Clause 12. An apparatus comprising means for performing a method according to any of clauses 1 to 10.

Clause 13. A non-transitory computer-readable medium storing computer-executable instructions, the computer-executable comprising at least one instruction for causing a computer or processor to perform a method according to any of clauses 1 to 10.

In one aspect, one or both of DSP 464 and processor 465, in conjunction with one or more remaining components illustrated in FIG. 4, can include logic/means to operate a noise filtering and suppression system by detecting and identifying noises in sound signals that occur during calls and selectively filtering and suppressing the noises, using a machine learning module with a neural network to detect and identify the noises, and allowing a user to select the noises that the user wants to filter and suppress during calls, as shown, for example, in Blocks 302-362 of FIGS. 3A and 3B. For example, DSP 464, ML module 468 and/or processor 465 can include logic/means to implement functions related to receive a sound signal, detect noises in the received sound signal, identify the noises in the received sound signal, display the identified noises in a user interface (UI), receive a selection of the displayed identified noises from the UI, and filter the received selection of the displayed identified noises from the received sound signal. The logic/means is further configured to: utilize a machine learning module with a neural network to detect and identify the noises in the received sound signal and use a location of the mobile device to identify the noises in the received sound signal.

It should be noted that although FIG. 4 depicts a wireless communications device, DSP 464, processor 465. ML module 468 and memory 240 may also be integrated into a device, selected from the group consisting of a set-top box, a music player, a video player, an entertainment unit, a navigation device, a communications device, a personal digital assistant (PDA), a fixed location data unit, laptop, tablet or a computer. Moreover, such a device may also be integrated in a semiconductor die.

Accordingly it will be appreciated from the foregoing that at least one aspect includes a mobile device having a memory and a processor configured to: receive a sound signal, detect noises in the received sound signal, identify the noises in the received sound signal, display the identified noises in a user interface (UI), receive a selection of the displayed identified noises from the UI, and filter the received selection of the displayed identified noises from the received sound signal. The processor is further configured to: utilize a machine learning module with a neural network to detect and identify the noises in the received sound signal and use a location of the mobile device to identify the noises in the received sound signal.

The various aspects disclosed advantageously allows the mobile device to detect and identify noises in sound signals that occur during calls and selectively filter and suppress the noises, utilize a machine learning module with a neural network to detect and identify the noises, and allow a user to select the noises that the user wants to filter and suppress during calls.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable media embodying a method for detecting and identifying noises in sound signals that occur during calls and selectively filtering and suppressing the noises, utilizing a machine learning module with a neural network to detect and identify the noises, and allowing a user to select the noises that the user wants to filter and suppress during calls. Accordingly, the disclosure is not limited to illustrated examples and any means for performing the functionality described herein are included in aspects of the disclosure.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

The foregoing disclosed devices and methods are typically designed and are configured into GDSII and GERBER computer files, stored on a computer readable media. These files are in turn provided to fabrication handlers who fabricate devices based on these files. The resulting products are semiconductor wafers that are then cut into semiconductor die and packaged into a semiconductor chip. The chips are then employed in devices described above.

What is claimed is:

1. A method of suppressing noises in a mobile device, the method comprising:
   receiving a sound signal that includes a voice signal and the noises from another mobile device;
   detecting the noises in the received sound signal;
   identifying the noises in the received sound signal;
   displaying the identified noises in a user interface (UI);
   receiving a selection of the displayed identified noises from the UI; and
   filtering the received selection of the displayed identified noises from the received sound signal to output the voice signal, wherein a machine learning module with a trained neural network is utilized to detect and identify the noises in the received sound signal.

2. The method of claim 1, further comprising:
   transmitting the filtered sound signal.

3. The method of claim 2, wherein the sound signal is generated from a microphone.

4. The method of claim 3, wherein the filtered sound signal is transmitted to another mobile device.

5. The method of claim 3, further comprising:
   converting the received sound signal from an analog signal to a digital signal.

6. The method of claim 2, wherein the filtered sound signal is transmitted to a speaker.

7. The method of claim 6, further comprising:
   converting the filtered sound signal from a digital signal to an analog signal.

8. The method of claim 1, further comprising:
   using a location of the mobile device to identify the noises in the received sound signal.

9. The method of claim 1, wherein the UI displays checkboxes next to the identified noises to receive the selection of the displayed identified noises.

10. A mobile device comprising:
    a memory; and
    a processor communicatively coupled to the memory, the processor configured to:
      receive a sound signal that includes a voice signal and noises from another mobile device;
      detect the noises in the received sound signal utilizing a machine learning module with a trained neural network;
      identify the noises in the received sound signal utilizing the machine learning module with the trained neural network;
      display the identified noises in a user interface (UI);
      receive a selection of the displayed identified noises from the UI; and
      filter the received selection of the displayed identified noises from the received sound signal to output the voice signal.

11. The mobile device of claim 10, further comprising:
    a transceiver configured to transmit the filtered sound signal.

12. The mobile device of claim 11, wherein the filtered sound signal is transmitted to a speaker.

13. The mobile device of claim 12, further comprising:
    a codec configured to convert the filtered sound signal from a digital signal to an analog signal.

14. The mobile device of claim 10, further comprising:
    a microphone configured to receive the sound signal from a user of the mobile device.

15. The mobile device of claim 14, further comprising:
    a codec configured to convert the received sound signal from an analog signal to a digital signal.

16. The mobile device of claim 10, wherein the filtered sound signal is transmitted to another mobile device.

17. The mobile device of claim 10, wherein the processor is further configured to use a location of the mobile device to identify the noises in the received sound signal.

18. The mobile device of claim 10, wherein the UI displays checkboxes next to the identified noises to receive the selection of the displayed identified noises.

19. A mobile device comprising:
means for receiving a sound signal that includes a voice signal and noises from another mobile device;
means for detecting noises in the received sound signal;
means for identifying the noises in the received sound signal;
means for utilizing a machine learning module with a trained neural network to detect and identify the noises in the received sound signal;
means for displaying the identified noises in a user interface (UI);
means for receiving a selection of the displayed identified noises from the UI; and
means for filtering the received selection of the displayed identified noises from the received sound signal.

20. The mobile device of claim 19, further comprising:
means for transmitting the filtered sound signal.

21. The mobile device of claim 19, further comprising:
means for using a location of the mobile device to identify the noises in the received sound signal.

22. The mobile device of claim 19, wherein the UI displays checkboxes next to the identified noises to receive the selection of the displayed identified noises.

23. A non-transitory computer-readable storage medium comprising code, which, when executed by a processor, causes the processor to suppress noises in a sound signal in a mobile device, the non-transitory computer-readable storage medium comprising:
code for receiving a sound signal that includes a voice signal and the noises from another mobile device;
code for detecting noises in the received sound signal;
code for identifying the noises in the received sound signal;
code for utilizing a machine learning module with a trained neural network to detect and identify the noises in the received sound signal;
code for displaying the identified noises in a user interface (UI);
code for receiving a selection of the displayed identified noises from the UI; and
code for filtering the received selection of the displayed identified noises from the received sound signal to output the voice signal.

24. The non-transitory computer-readable storage medium of claim 23, further comprising:
code for transmitting the filtered sound signal.

25. The non-transitory computer-readable storage medium of claim 23, further comprising:
code for using a location of the mobile device to identify the noises in the received sound signal.

26. The non-transitory computer-readable storage medium of claim 23, further comprising:
code for displaying checkboxes next to the identified noises to receive the selection of the displayed identified noises.

* * * * *